Nov. 24, 1925.

M. V. MORGAN 1,562,907

SAFETY LOCKING DEVICE FOR USE WITH BOLTS, NUTS, AND THE LIKE

Filed Oct. 6, 1923

Inventor
Montague Vivian Morgan
by B. Singer Atty

Patented Nov. 24, 1925.

1,562,907

UNITED STATES PATENT OFFICE.

MONTAGUE VIVIAN MORGAN, OF LONDON, ENGLAND.

SAFETY LOCKING DEVICE FOR USE WITH BOLTS, NUTS, AND THE LIKE.

Application filed October 6, 1923. Serial No. 666,940.

*To all whom it may concern:*

Be it known that I, MONTAGUE VIVIAN MORGAN, a British subject, residing at 25A Motcomb Street, London, S. W. 1, England, have invented certain new and useful Improvements in and Relating to Safety Locking Devices for Use with Bolts, Nuts, and the like, of which the following is a specification.

This invention relates to a locking device for use with bolts, nuts, set screws and the like.

The object of the present invention is the prevention of movement relative to one another of the work, device, bolt, nut or the like.

In carrying my invention into effect I employ a washer with a ball arranged in the circumference of the bolt hole and a peculiarly shaped extension formed from a sector of the periphery of the washer.

In the accompanying drawings.

Figure 2:
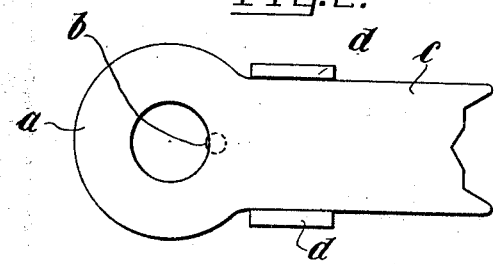
Fig. 2 is a plan of same.
Figure 1:
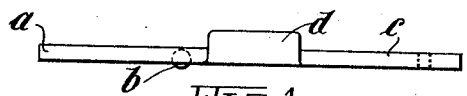
Fig. 1 is a side elevation of a washer made according to the invention.

In the drawings, $a$ is a washer with a ball $b$ fitted into the body, in the circumference of the bolt hole, in such a manner that part of $b$ projects from the under surface of $a$.

$c$ is an extension from a sector of the periphery of $a$.

$c$ for half its length is wider on each side by an equal amount than for the remainder of its length.

The wider portions $d$ are bent up to form lugs which project above the top surface of $a$ allowing the remaining portion of $c$ to be bent right over on itself and lie flat between the said lugs $d$.

The extremity of extension $c$ is so shaped that it allows the end portion of $c$ when folded back between $d$ to lie correctly against a flat or a corner of a nut, bolt head, or the like.

Figure 3:
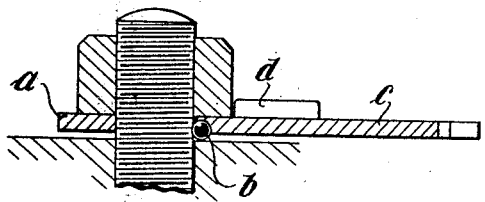
Fig. 3 shows a fragmentary sectional view of the end of a bolt with the washer and a nut disposed thereon, before being screwed down.
Figure 4:
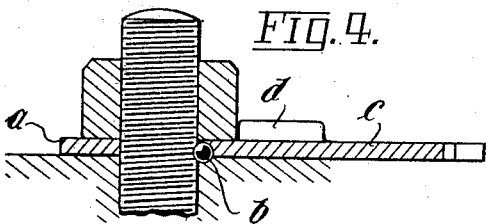
Fig. 4 shows similar view to Fig. 3, but with the nut screwed down.

In operation this device is placed like an ordinary washer on a bolt and the work (see Fig. 3) and the action of tightening home the nut, wedges the ball $b$, owing to its shape, between the work and the bolt and into the work and the bolt (see Fig. 4) and whilst the nut remains tight home, relative movement between work, bolt and device is prevented by ball $b$.

Figure 5:
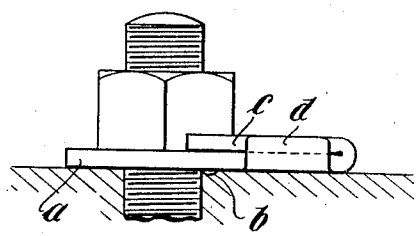
Fig. 5 shows in exterior side elevation and Fig. 6 in plan, the position of the parts with the nut screwed down and engaged by the washer.
Figure 6:
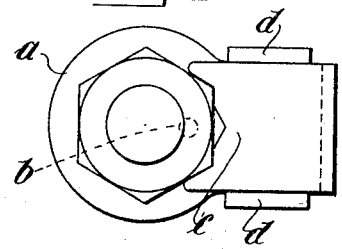

The outer portion of $c$ is now folded over to lie between $d$ with its correspondingly shaped extremity against the bottom of either a flat or corner of the nut, as shown in Figs. 5 and 6; whilst in this position movement between device and the nut relative to one another is prevented and therefore relative movement between work, bolt, device and nut is prevented.

Though mention is made of only one ball $b$, one or more may be fitted into the body of the washer and similarly one or more extensions $c$ may be employed from the periphery of $a$.

I am aware that it has been proposed to use a device having points or projections for forcing into the thread of a bolt or into the work the device is used in conjunction with, and that washers are also known having folds or lugs adapted to be turned back for engaging the nut; and it will be readily understood that no claim is made or intended to be made for any such construction by itself.

What I claim as my invention and desire to secure by Letters Patent in the United States of America is:—

1. A nut lock comprising a washer having an aperture to receive a bolt, a ball housed in a recess in said washer, projecting from one surface of the washer and also projecting into the said aperture, said washer also having a tongue-like foldable extension arranged to be doubled over the washer and shaped at its outer end to conform to the side of the nut on said bolt and against which said doubled extension bears.

2. A nut lock comprising a washer having an aperture to receive a bolt, a ball housed in a recess in said washer, projecting from one surface of the washer and also projecting into the said aperture, said washer also having a tongue-like foldable extension arranged to be doubled over the washer and shaped at its outer end to conform to the side of the nut on said bolt and against which said doubled extension bears, the said washer also having lugs engaging opposite sides of said doubled extension.

In witness whereof I affix my signature.

MONTAGUE VIVIAN MORGAN.